United States Patent
Aval et al.

(10) Patent No.: US 12,067,964 B2
(45) Date of Patent: Aug. 20, 2024

(54) ACTIVE SOUND MANAGEMENT IN NOISE CANCELATION SYSTEMS

(71) Applicant: Bose Corporation, Framingham, MA (US)

(72) Inventors: Yashar Motedayen Aval, Bedford, MA (US); Siamak Farahbakhsh, Waltham, MA (US); Dennis D. Klug, West Bloomfield, MI (US)

(73) Assignee: Bose Corporation, Framingham, MA (US)

(*) Notice: Subject to any disclaimer, the term of this patent is extended or adjusted under 35 U.S.C. 154(b) by 146 days.

(21) Appl. No.: 17/600,185

(22) PCT Filed: Mar. 30, 2020

(86) PCT No.: PCT/US2020/025752
§ 371 (c)(1),
(2) Date: Sep. 30, 2021

(87) PCT Pub. No.: WO2020/205756
PCT Pub. Date: Oct. 8, 2020

(65) Prior Publication Data
US 2022/0208167 A1    Jun. 30, 2022

Related U.S. Application Data

(60) Provisional application No. 62/827,554, filed on Apr. 1, 2019.

(51) Int. Cl.
*G10K 11/178* (2006.01)
*B60Q 9/00* (2006.01)

(52) U.S. Cl.
CPC .. *G10K 11/17854* (2018.01); *G10K 11/17823* (2018.01); *G10K 11/17825* (2018.01); *G10K 11/17881* (2018.01); *B60Q 9/00* (2013.01); *G10K 2210/121* (2013.01); *G10K 2210/12821* (2013.01); *G10K 2210/3011* (2013.01); *G10K 2210/3026* (2013.01); *G10K 2210/3027* (2013.01); *G10K 2210/3028* (2013.01)

(58) Field of Classification Search
CPC .................................. G10K 2210/121
See application file for complete search history.

(56) References Cited

U.S. PATENT DOCUMENTS

2006/0269078 A1* 11/2006 Sakamoto .......... G10K 11/1783
381/71.1

\* cited by examiner

*Primary Examiner* — Ping Lee

(57) ABSTRACT

Noise cancellation systems and methods are provided that receive a reference signal representative of a noise to be reduced and provide a noise cancellation signal based upon the reference signal. Some examples include a feedback signal representative of a residual noise in the environment. At least one of the reference signal, the noise cancellation signal, or the feedback signal is filtered to remove components based upon a rotational rate of a rotating equipment associated with the environment, such as an engine of a vehicle. Accordingly, the noise cancellation system may not interfere with sounds related to the engine.

14 Claims, 7 Drawing Sheets

ACTIVE SOUND MANAGEMENT IN NOISE CANCELATION SYSTEMS

CROSS REFERENCE TO RELATED APPLICATIONS

This application is related to and claims the benefit of U.S. Provisional Patent Application Ser. No. 62/827,554, titled "ACTIVE SOUND MANAGEMENT IN NOISE CANCELATION SYSTEMS" filed Apr. 1, 2019, which is incorporated herein in its entirety for all purposes.

BACKGROUND

Example road noise cancellation (RNC) systems may generate audio signals intended to counter road noise, and may use accelerometers in various locations in a vehicle to provide a road noise reference source. Feedback microphones may monitor the resulting acoustic energy in the vehicle cabin and adjust various operational characteristics of the road noise cancellation system, such as adaptive feedforward filters and the like. Additionally, active sound management (ASM) systems may operate to enhance or otherwise alter a perceived sound of the vehicle's operation, such as by engine harmonic cancellation (EHC) and/or engine harmonic enhancement (EHE) (collectively, EHx). In various examples, signals generated by the ASM system or the RNC system may interact, such as either system may cause the other to alter operation. For example, active sounds generated by the ASM system may be perceived as road noise by the RNC system, such that the RNC system may attempt to reduce the sounds that the ASM system is actively operating to generate. Such affect may be further aggravated if engine vibration is picked up by the RNC system's accelerometers. Accordingly, there is a need to resolve or reduce the interaction of ASM and RNC systems.

SUMMARY

Systems and methods disclosed herein are directed to noise cancellation systems, methods, and applications that remove selected signal components, such as those related to the rotation of an engine, from various signals operated upon by the noise cancellation system, to allow the noise cancellation system to operate without interfering in the acoustic sound related to the engine.

According to one aspect, a noise cancellation method is provided that includes receiving a reference signal representative of a noise to be reduced, providing a noise cancellation signal based upon the reference signal, receiving a feedback signal representative of a residual noise in the environment, and filtering at least one of the reference signal, the noise cancellation signal, or the feedback signal based upon a rotational rate of a rotating equipment associated with the environment.

In various examples, filtering at least one of the reference signal, the noise cancellation signal, or the feedback signal based upon a rotational rate of a rotating equipment includes filtering out a bandwidth of frequencies based upon a change of the rotational rate.

Some examples include determining a first rotational rate at a first time, determining a second rotational rate at a second time, and determining a difference between the first rotational rate and the second rotational rate as the change of the rotational rate.

In certain examples, a range of the bandwidth of frequencies is linearly related to a range of the change of the rotational rate.

In various examples, filtering at least one of the reference signal, the noise cancellation signal, or the feedback signal based upon a rotational rate of a rotating equipment includes filtering out a bandwidth of frequencies based upon a rate of change of the rotational rate.

In some examples, filtering at least one of the reference signal, the noise cancellation signal, or the feedback signal based upon a rotational rate of a rotating equipment includes filtering out a notch of frequencies centered on a frequency based upon the rotational rate. The frequency may be a harmonic of the rotational rate in certain examples.

According to another aspect, a noise cancellation system is provided that includes a noise sensor configured to provide a reference signal representative of a noise to be reduced in an environment, a controller coupled to the noise sensor to receive the reference signal and to provide a noise cancellation signal based upon the reference signal, a transducer coupled to the controller to transduce the noise cancellation signal into an acoustic signal in the environment, and a filter coupled to the controller, the filter filtering a selected signal based upon a rotational rate of a rotating equipment associated with the environment.

Some examples include a feedback sensor to provide a feedback signal representative of a residual noise in the environment, and the selected signal is at least one of the reference signal, the noise cancellation signal, and the feedback signal.

In various examples, filtering a selected signal based upon a rotational rate of a rotating equipment includes filtering out a bandwidth of frequencies based upon a change of the rotational rate.

In some examples, the controller determines a first rotational rate at a first time, determines a second rotational rate at a second time, and determines a difference between the first rotational rate and the second rotational rate as the change of the rotational rate.

In certain examples, a range of the bandwidth of frequencies is linearly related to a range of the change of the rotational rate.

In various examples, filtering a selected signal based upon a rotational rate of a rotating equipment includes filtering out a bandwidth of frequencies based upon a rate of change of the rotational rate.

In some examples, filtering a selected signal based upon a rotational rate of a rotating equipment includes filtering out a notch of frequencies centered on a frequency based upon the rotational rate.

According to another aspect, a non-transitory computer readable medium is provided including instructions stored thereon that, when executed by a suitable processor, cause the processor to receive a reference signal representative of a noise to be reduced in an environment, provide a noise cancellation signal based upon the reference signal, and filter a selected signal based upon a rotational rate of a rotating equipment associated with the environment.

In some examples, the processor also receives a feedback signal representative of a residual noise in the environment, and the selected signal is at least one of the reference signal, the noise cancellation signal, and the feedback signal.

In various examples, filtering a selected signal based upon a rotational rate of a rotating equipment includes filtering out a bandwidth of frequencies based upon a change of the rotational rate.

In some examples, the processor may determine a first rotational rate at a first time, determine a second rotational rate at a second time, and determine a difference between the first rotational rate and the second rotational rate as the change of the rotational rate.

In certain examples, a range of the bandwidth of frequencies is linearly related to a range of the change of the rotational rate.

In various examples, filtering a selected signal based upon a rotational rate of a rotating equipment includes filtering out a notch of frequencies centered on a frequency based upon the rotational rate.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures.

DETAILED DESCRIPTION

Figure 1:
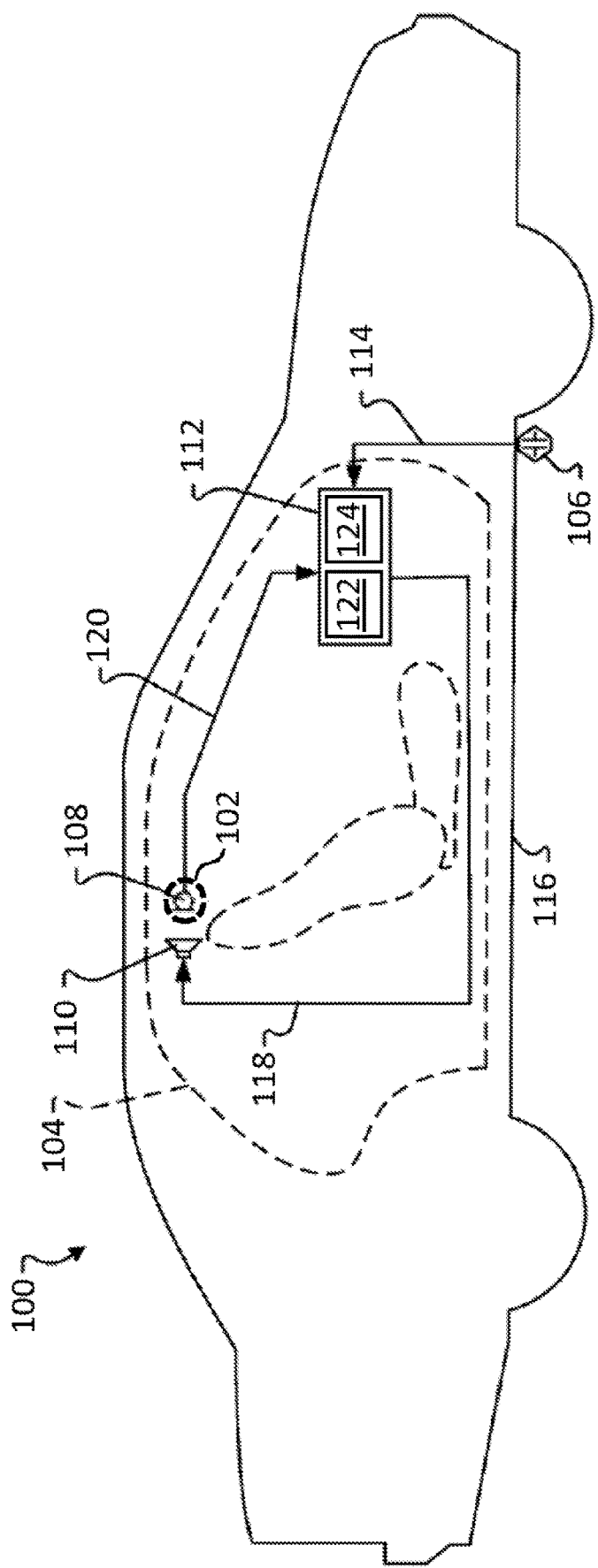
FIG. 1 is a schematic block diagram of an example road noise cancellation system.

Noise cancellation systems attempt to acoustically reduce (or 'cancel') various sound in an acoustic space. In a vehicle, for example, a road noise cancellation (RNC) system may attempt to reduce or "go after" road noise in a cabin of the vehicle. Active sound management (ASM) systems, such as engine harmonic cancellation (EHC) and engine harmonic enhancement (EHE) systems, attempt to adjust the sound of an engine (or other rotational equipment) related to the operation of the vehicle. Aspects of the present disclosure are directed to systems and methods suitable for use in a vehicle to remove or reduce selected signal components of the noise cancellation system, such as signal components related to the engine or other rotational equipment, so that the noise cancellation system will not go after or attempt to reduce the selected signal components.

For instance, without the benefits of the instant disclosure, an RNC system may alter or reduce the engine sound in the cabin, which may be undesirable. When an RNC system and an EHE system operate in parallel, the RNC system may attempt to cancel the engine harmonics that the EHE system is generating, especially if a reference signal from accelerometers contains these harmonics. When an RNC system and an EHC system operate in parallel, there may be adverse effects on stability as both adaptive systems attempt at cancel various engine harmonics.

Various examples disclosed herein filter (e.g., remove) engine harmonics from various signals of the RNC system. In various examples, the engine harmonics to be removed may be identified by RPM information and/or from the EHx system(s). Across various examples, such a filter may be applied directly to one or more reference signals, one or more speaker signals (also termed speaker commands or command signals), one or more error or feedback signals, e.g., from a feedback microphone, or any combination of these.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

Also, the phraseology and terminology used herein is for the purpose of description and should not be regarded as limiting. Any references to examples, components, elements, acts, or functions of the systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including" "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

FIG. 1 is a schematic view of an example noise cancellation system 100 which may perform a norm calculation. Noise cancellation system 100 may be configured to destructively interfere with undesired sound in at least one cancellation zone 102 within a predefined volume 104 such as a vehicle cabin. At a high level, an embodiment of noise cancellation system 100 may include a reference sensor 106, a feedback sensor 108, an transducer 110, and a controller 112.

In an embodiment, reference sensor 106 is configured to generate reference signal(s) 114 representative of the undesired sound, or a source of the undesired sound, within predefined volume 104. For example, as shown in FIG. 1, reference sensor 106 may be an accelerometer mounted to and configured to detect vibrations transmitted through a vehicle structure 116. Vibrations transmitted through the vehicle structure 116 are transduced by the structure into undesired sound in the vehicle cabin (perceived as road noise), thus an accelerometer mounted to the structure provides a signal representative of the undesired sound. While the noise cancellation system 100 of FIG. 1 illustrates merely an example having a single reference sensor 106, various examples may include multiple reference sensors 106.

Transducer 110 may be, for example, speakers distributed in discrete locations about the perimeter of the predefined volume. In an example, four or more speakers may be disposed within a vehicle cabin, each of the four speakers being located within a respective door of the vehicle and configured to project sound into the vehicle cabin. In alternate embodiments, speakers may be located within a headrest, or elsewhere in the vehicle cabin.

A noise cancellation signal 118 may be generated by controller 112 and provided to one or more speakers in the predefined volume, which transduce the noise cancellation signal 118 to acoustic energy (i.e., sound waves). The acoustic energy produced as a result of noise cancellation signal 118 is approximately 180° out of phase with—and thus destructively interferes with—the undesired sound within the cancellation zone 102. The combination of sound waves generated from the noise cancellation signal 118 and the undesired noise in the predefined volume results in cancellation of the undesired noise, as perceived by a listener in a cancellation zone.

Feedback sensor 108, disposed within the predefined volume, generates a feedback signal 120 based on detection of residual noise resulting from the combination of the sound waves generated from the noise cancellation signal 118 and the undesired sound in the cancellation zone. The feedback signal 120 is provided to controller 112 as feedback, feedback signal 120 representing residual noise uncancelled by the noise cancellation signal as well as other acoustic energy. Error sensors 108 may be, for example, at least one microphone mounted within a vehicle cabin (e.g., in the roof headrests, pillars, or elsewhere within the cabin).

It should be noted that the cancellation zone(s) may be positioned remotely from feedback sensor 108. In this case, the feedback signal 120 may be transformed to represent an estimate of the residual noise in the cancellation zone(s).

In an embodiment, controller 112 may comprise a non-transitory storage medium 122 and processor 124. In an embodiment, non-transitory storage medium 122 may store program code that, when executed by processor 124, implements the various filters and algorithms described below.

Controller 112 may be implemented in hardware and/or software. For example, the controller may be implemented by a SHARC floating-point DSP processor, but it should be understood that the controller may be implemented by any other processor, FPGA, ASIC, or other suitable hardware.

Figure 2:
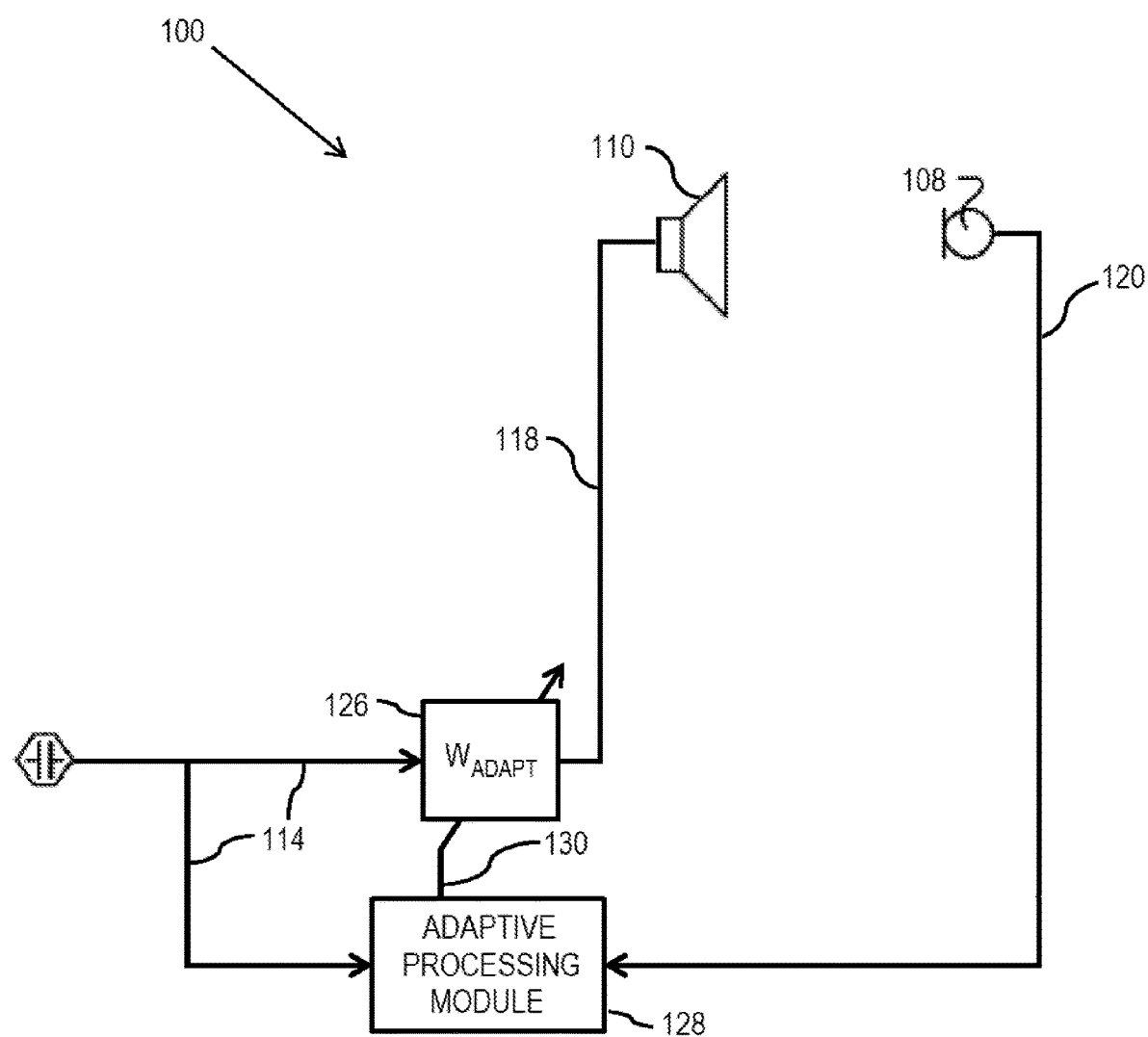
FIG. 2 is a schematic block diagram of an example signal flow that may be associated with the road noise cancelation system of FIG. 1.

Turning to FIG. 2, there is shown a block diagram of an embodiment of noise cancellation system 100, including filter components implemented by controller 112. As shown, the controller 112 may define a control system including an adaptive filter 126 and an adaptive processing module 128.

Adaptive filter 126 is configured to receive the reference signal 114 of reference sensor 106 and to generate noise cancellation signal 118. Noise cancellation signal 118, as described above, is input to transducer 110 where it is transduced into the noise cancellation audio signal that destructively interferes with the undesired sound in the predefined cancellation zone 102. Adaptive filter 126 may be implemented as any suitable linear filter, such as a multi-input multi-output (MIMO) finite impulse response (FIR) filter. Adaptive filter 126 employs a set of coefficients which define the noise cancellation signal 118 in response to the reference signal 114 and which may be adjusted to adapt to changing behavior of the vehicle response to road input (or to other inputs in non-vehicular noise cancellation contexts).

Adjustments to the coefficients of the adaptive filter 126 may be performed by an adaptive processing module 128, which receives as inputs the feedback signal 120 and the reference signal 114 and, using those inputs, generates a filter update signal 130. The filter update signal 130 is an update to the filter coefficients implemented in the adaptive filter 126. The noise cancellation signal 118 produced by the updated adaptive filter 126 will minimize feedback signal 120 (or a projection or transform thereof), and consequently reduce the undesired noise in the cancellation zone.

Figure 3:
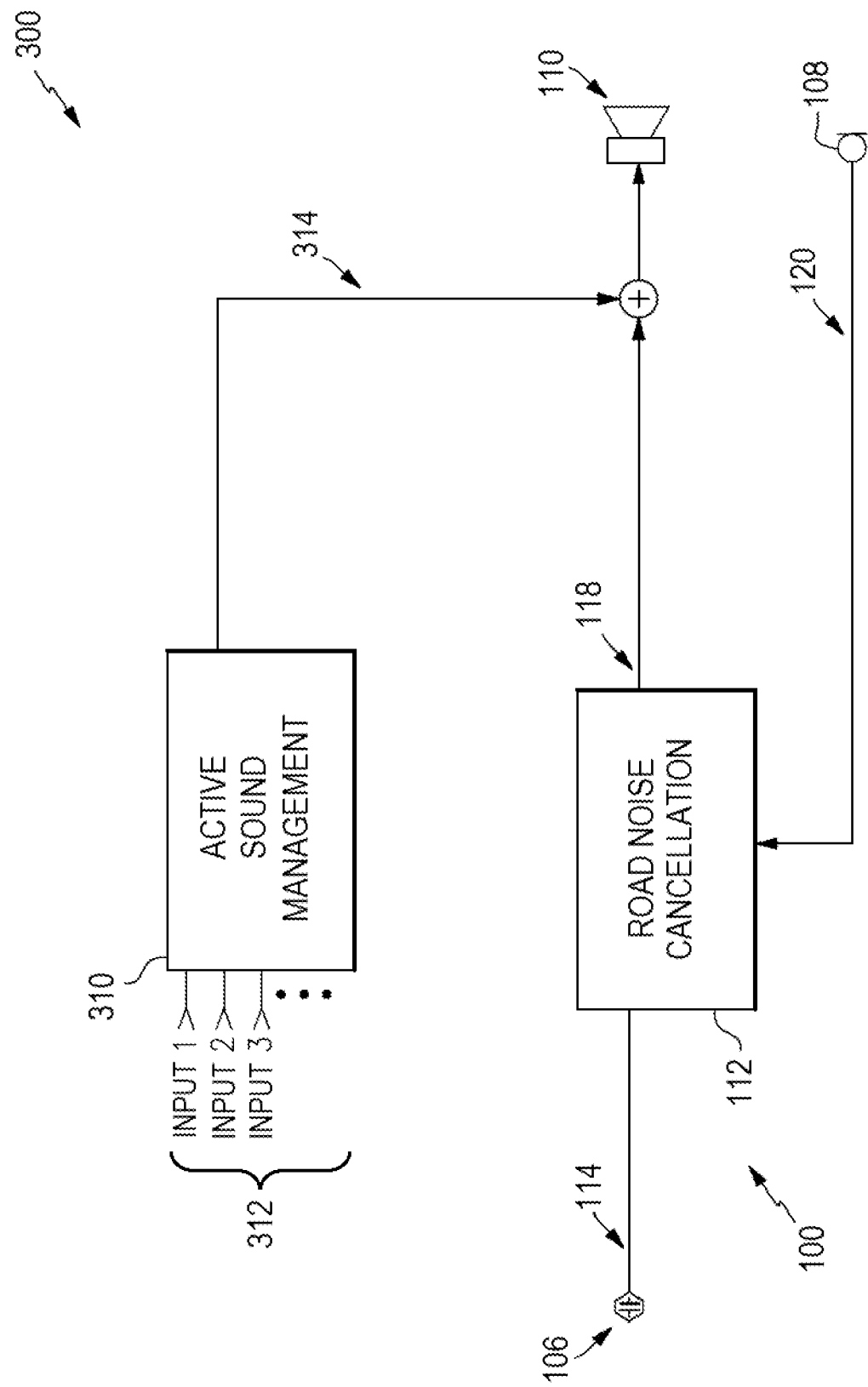
FIG. 3 is a schematic block diagram of an example audio system.

FIG. 3 illustrates an example audio system 300 that includes a noise cancellation system 100, e.g., as a subsystem, and also includes an active sound management system 310 to provide additional audio signals that may be transduced by the transducer(s) 110. Various examples may include additional audio sources, such as entertainment, navigation, and driver warning systems that provide audio signals to also be transduced by the transducer(s) 110.

The active sound management system 310 may provide one or more active sound signal(s) 314 to be rendered by the acoustic transducers 110. Examples of the active sound management system 310 may include various acoustic reduction or enhancement systems, such as engine and/or transmission harmonic cancellation and/or enhancement. Such systems may generate sound to enhance or reduce the interior acoustic signature of an engine and power train, a continuously variable transmission, an electric vehicle, or the like, and/or to mimic or mask various acoustic properties to create differing acoustic experiences related to the operation of the vehicle.

In various examples, reduced or enhanced sounds may be related to engine or drive train harmonics, and such systems may generally be referred to as engine harmonic cancelation (EHC) and/or engine harmonic enhancement (EHE) systems. Such may also refer to systems that enhance or reduce vehicle sounds not related to harmonics, or that create new sounds, such as a sound generator to create sound effects such as backfire, afterfire, crackle sound effects, and the like. Further, an active sound management system 310 may create an acoustic environment intended to make one thing sound like another, such as to make an electric vehicle sound like a gasoline vehicle, or to make a continuously variable transmission sound like gear shifting, or the like, or to make an entirely new machinery sound, for instance.

The active sound management system may receive any number of input signals 312. Example input signals 312 for EHE/EHC systems may include an indication of rotations per minute (RPM), torque, load, temperature, or the like of any of the vehicle rotating equipment (such as engine, transmission, wheels, etc.), or other operating condition of any of the vehicle equipment that may be the basis for producing enhancement or cancellation sounds (e.g., position of an accelerator pedal or control, position of a brake pedal or control, steering wheel position, gear and/or gear changes, or other operator control inputs).

In various examples, an active sound signal 314 is combined with the noise cancellation signal 118 to be transduced by the transducer 110. In other examples, the active sound signal 314 and the noise cancellation signal 118 may be transduced by separate transducers 110. In either case, the feedback sensor 108 detects acoustic energy in the environment that may be contributed by each of the noise cancellation signal 118 and the active sound signal 314. As described above, components of the active sound signals 314 may be related to an engine harmonic and/or harmonics of other portions of rotating equipment of the vehicle, such as a drivetrain and/or wheel(s). Additionally, the reference sensor 106 may detect vibrations related to these harmonics, causing components in the reference signal 114 to also be related to these harmonics. Accordingly, the noise cancellation system 100 may go after these harmonic components attempting to reduce their presence in the vehicle cabin while the active sound management system 310 may be attempting to increase these harmonic components in the vehicle cabin. Thus these two systems may at best be working against each other. Each of the noise cancellation and active sound management systems may also include adaptive operations, thus these two systems may at worst cause instabilities in each other.

Figure 4:
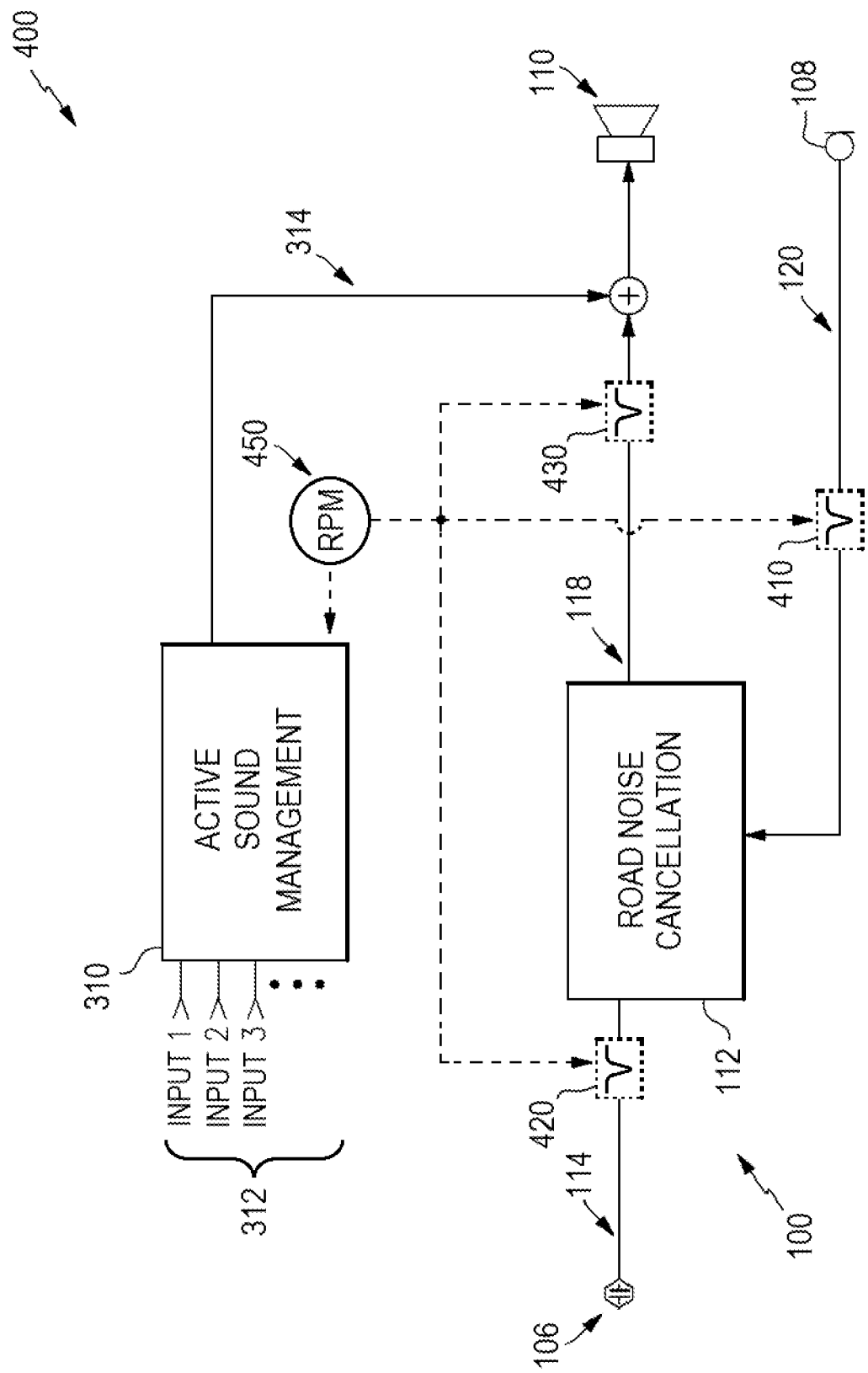
FIG. 4 is a schematic block diagram of another example audio system.

FIG. 4 illustrates an example audio system 400 including example variations from that of the audio system 300 to resolve action by the noise cancellation system 100 that may alter the sound of the engine or other rotating equipment of the vehicle, depending upon the implementation. Accordingly, the example audio system 400 of FIG. 4 may also resolve interaction between the noise cancellation system 100 and the active sound management system 310. In various examples, one or more notch filters configured based upon an RPM 450 operates on at least one of the feedback signal 120, the reference signal 114, the noise cancellation signal 118, or a combination of these signals. For example, a filter 410 may be included to modify the feedback signal 120 to remove harmonic components related to the RPM 450. Alternatively or additionally, a filter 420 may be included to modify the reference signal 114 to remove harmonic components related to the RPM 450. In addition to or instead of either or both of filters 410, 420, a filter 430 may be included to modify the noise cancellation signal 118 to remove harmonic components related to the RPM 450. Any one or more of the filters 410, 420, 430, may reduce the effect of the noise cancellation system 100 on the removed harmonic components related to the RPM 450.

For example, the filter 410 removes harmonic components from the feedback signal 120, effectively causing the noise cancellation system 100 to think that it has been successful at removing the harmonic components when it hasn't. The filter 420 removes harmonic components from the reference signal 114, effectively causing the noise cancellation system 100 to think that the harmonic components aren't a source of noise to be acted upon. The filter 430 removes harmonic components from the noise cancellation signal 118, effectively blocking the noise cancellation system 100 from impacting the harmonic components in the vehicle cabin.

Each of the various filter locations has the potential to degrade performance of the noise cancellation system 100 or to cause instability. For example, filtering the reference signal 114 may promote the noise cancellation system 100 to boost adaptive filter values at the frequency of the harmonics. Filtering the noise cancellation signal 118 may cause instability in the system as it alters the secondary path. To overcome these challenges, and in various examples, the harmonic filter(s) 410, 420, 430 are designed to be as narrow as possible to achieve the desired component removal.

A challenge in such filtering occurs when the RPM is changing rapidly (e.g. a spirited driving scenario), during which the engine harmonics may deviate from their narrowband nature, and therefore may not be contained with a narrow notch filter. If this deviation is unaccounted, the noise cancellation system may alter the engine sound, which may be particularly undesirable at, e.g., the exact moment when enhanced engine sound is desired, such as during rapid acceleration when the RPM is changing quickly.

Various examples in accord with those disclosed herein adjust one or more notch filters at one or more signal path locations in a noise cancellation system. The notch filter frequency and bandwidth is based on vehicle operational parameters such as RPM, RPM variation, and torque. The filter(s), for example, can be a simple IIR filter, whose poles and zeros are selected by the engine harmonic frequency and rate of RPM change. In various examples, the filtered reduction of harmonic components does not need to be very deep. For example, a 10 dB reduction or less may be sufficient, as the weakened harmonic that is played back in the cabin by RNC may be masked by the actual engine sound and/or an active sound management system.

According to some examples, a notch filter 430 operates on the noise cancellation signal 118, the notch can be made narrow enough such that no stability issues may be observed, e.g., the notch filter 430 may be designed to remove a narrow enough portion of spectrum that the noise cancellation system is unable to adapt to such a level of frequency resolution/granularity.

In certain examples the secondary path is known, and a projection of the signal that was filtered out may be added to the feedback signal such as to prevent the RNC system from boosting the gain at these frequencies.

In various examples, multiple notch filters may be cascaded to remove multiple harmonics.

Figure 5:
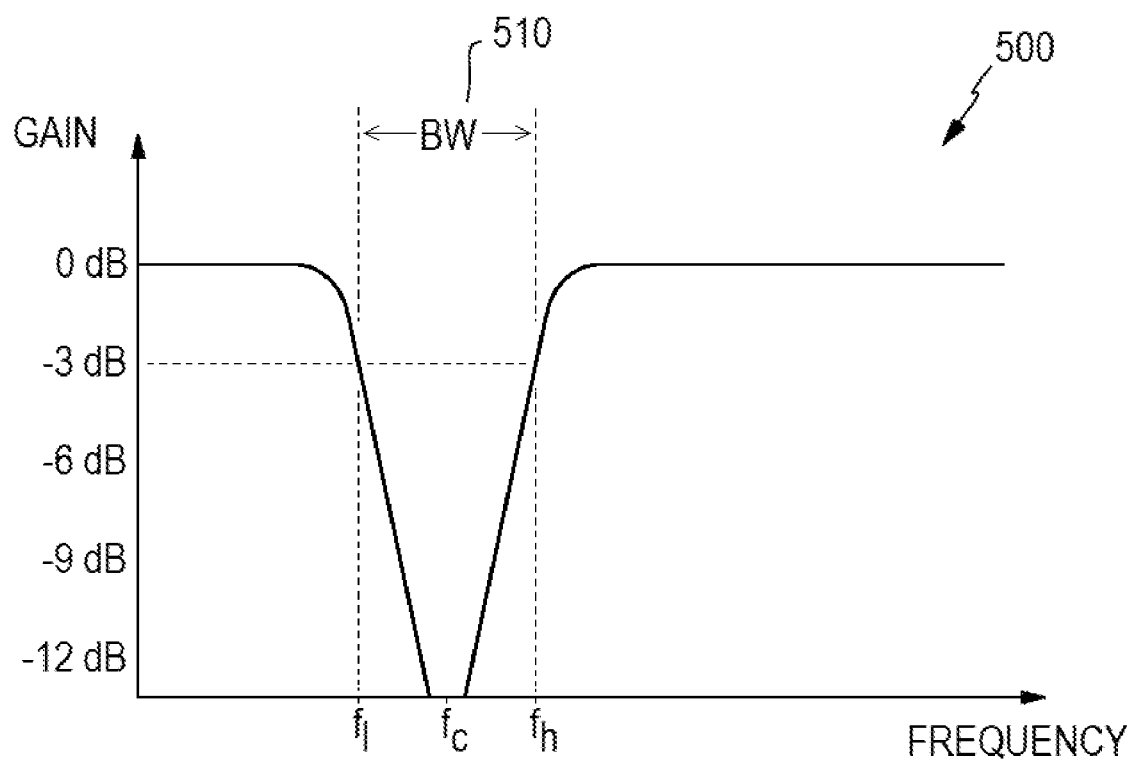
FIG. 5 is a graph of an example transfer function of a notch filter.

FIG. 5 illustrates a transfer function 500 of an example notch filter, e.g., which may be any of the filters 410, 420, 430. The notch filter removes (attenuates) a narrow range of frequencies centered on a center frequency, $f_c$, and having a notch bandwidth 510 extending from a low frequency, $f_l$, to a high frequency, $f_h$, which in the example notch filter is defined by a 3 dB drop-off from a nominal 0 gain at frequencies outside this range. In various examples the notch bandwidth may be defined by other amounts of reduction and/or may not have symmetrical response on either side of a center frequency.

In various examples, the center frequency is linked to RPM and the notch bandwidth 510 is proportionally linked to the rate of RPM variation. When RPM varies rapidly, engine harmonics occupy a wider bandwidth, and in many cases may be louder. Widening the notch bandwidth when RPM is changing assists in proper mitigation of the harmonic in these occasions. Further, varying notch bandwidth gives flexibility in preserving the most information in the RNC signals when the RPM is not substantially changing. For example, a narrower notch removes less signal content when cruising at an essentially constant RPM, and in such cases road noise may be the dominant noise source and the noise cancellation system 100 is allowed to pursue as much of the noise spectrum as possible.

When the vehicle is cruising at an essentially constant RPM, a narrow notch bandwidth 510 prevents the adaptive filter 126 from adapting to the filtered harmonic levels, e.g., by having a notch filter bandwidth 510 more narrow than a frequency resolution of the adaptive filter 126. In these scenarios, given that RPM changes slowly, the notch filter may be made orders of magnitude narrower than the resolution of the adaptive filter 126, in various examples.

When the vehicle is accelerating or decelerating, and the RPM is changing, a broader notch bandwidth 510 accommodates the changing harmonics. In various examples, a filter transfer function 500 for higher order harmonics may have a broader (wider) notch bandwidth 510 than for lower order harmonics. For example, a $5^{th}$ harmonic may exhibit a wider bandwidth than a $2^{nd}$ harmonic, and a filter transfer function 500 intended to attenuate the $5^{th}$ harmonic may have a wider notch bandwidth 510 than that intended to attenuate the $2^{nd}$ harmonic. Additionally, the center frequency of the notch filter is adjusted to the RPM, and is thus changing in such a scenario. Accordingly, the adaptive filter 126 does not have time to adapt to any particular operation of the notch filter, e.g., the filter(s) 410, 420, and/or 430.

Additionally, any of the filter(s) 410, 420, and/or 430 may alter the phase of the signal upon which it operates. Accordingly, the transfer function 500 is relatively narrow in various examples such that the notch filter introduces only a narrow range of phase inaccuracy.

Figure 6:
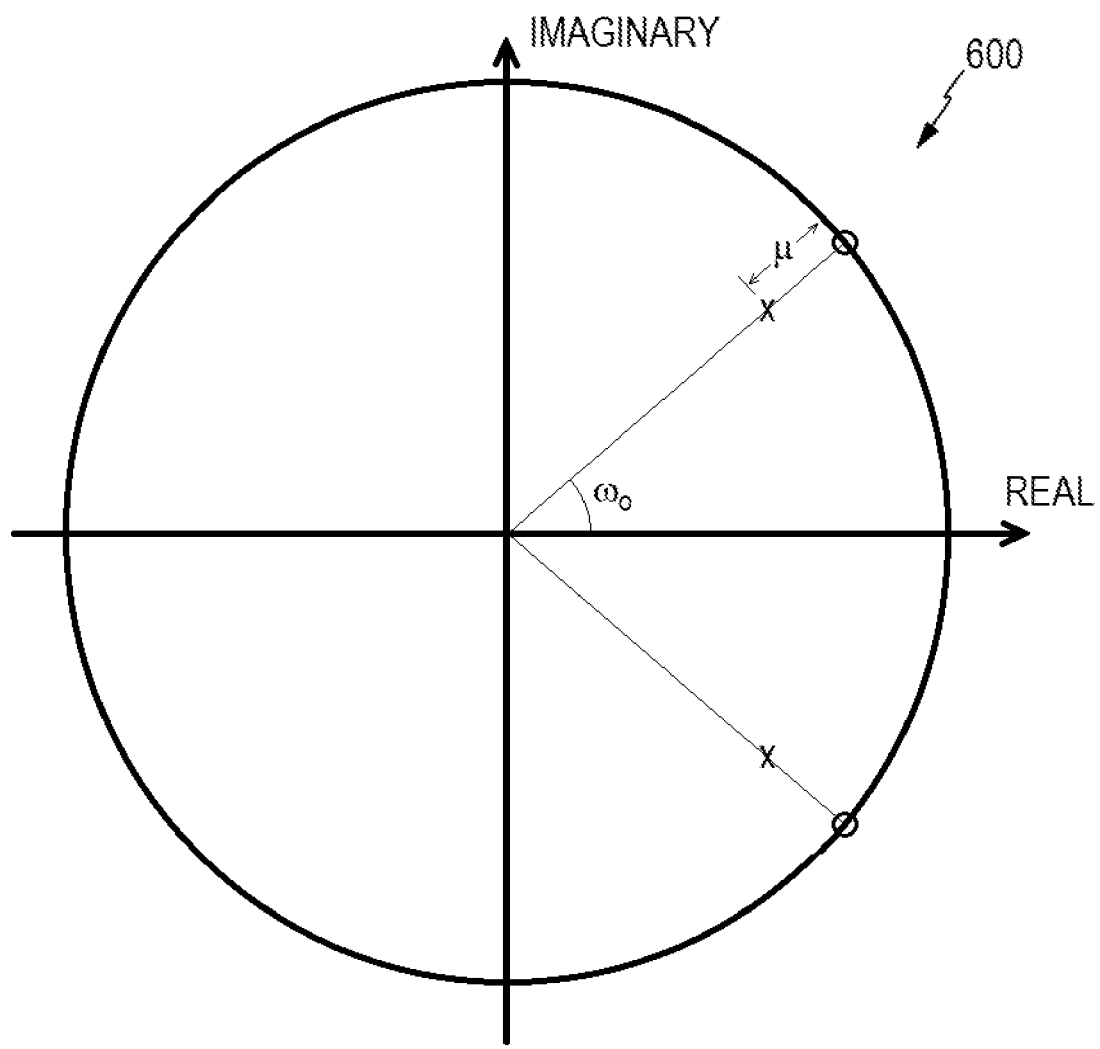
FIG. 6 is a graph of an example set of filter poles and zeros.

FIG. 6 illustrates an example digital filter design 600 that may be used in various examples. The filter design 600 represents a $2^{nd}$ order filter having zeros at the center frequency, which is based upon rotational rate, e.g., RPM, and poles offset from the zeros based upon an amount of change or a rate of change of the rotational rate. For example, the center frequency, $\omega_o$, in radians per second, for a given harmonic frequency, $f_n$, may be expressed in accord with Eq. 1, $$\omega_o = 2\pi \frac{f_n}{f_s} \quad (1)$$

wherein $f_s$ is the sampling frequency in a digital system and $f_n$ is the harmonic frequency of interest, each expressed in the same units, such as Hertz. The offset between a respective pole and zero may be expressed in accord with Eq. 2, $$\mu \cong 2\pi \frac{BW/2}{f_s} \quad (2)$$

wherein the bandwidth BW is the notch bandwidth as described above, expressed in the same units as the sampling frequency, $f_s$, such as Hertz. Various examples select a bandwidth, BW, based upon a measure of how quickly the RPM is changing, at least one example of which is described in more detail below with respect to FIG. 7. Although the filter design 600 illustrated in FIG. 6 shows poles substantially in a linear position between a respective zero and the origin, actual implementations may only be approximately placed as illustrated. The filter design 600 is merely one example of a filter design that may effectively attenuate a narrow range of frequencies.

Figure 7:
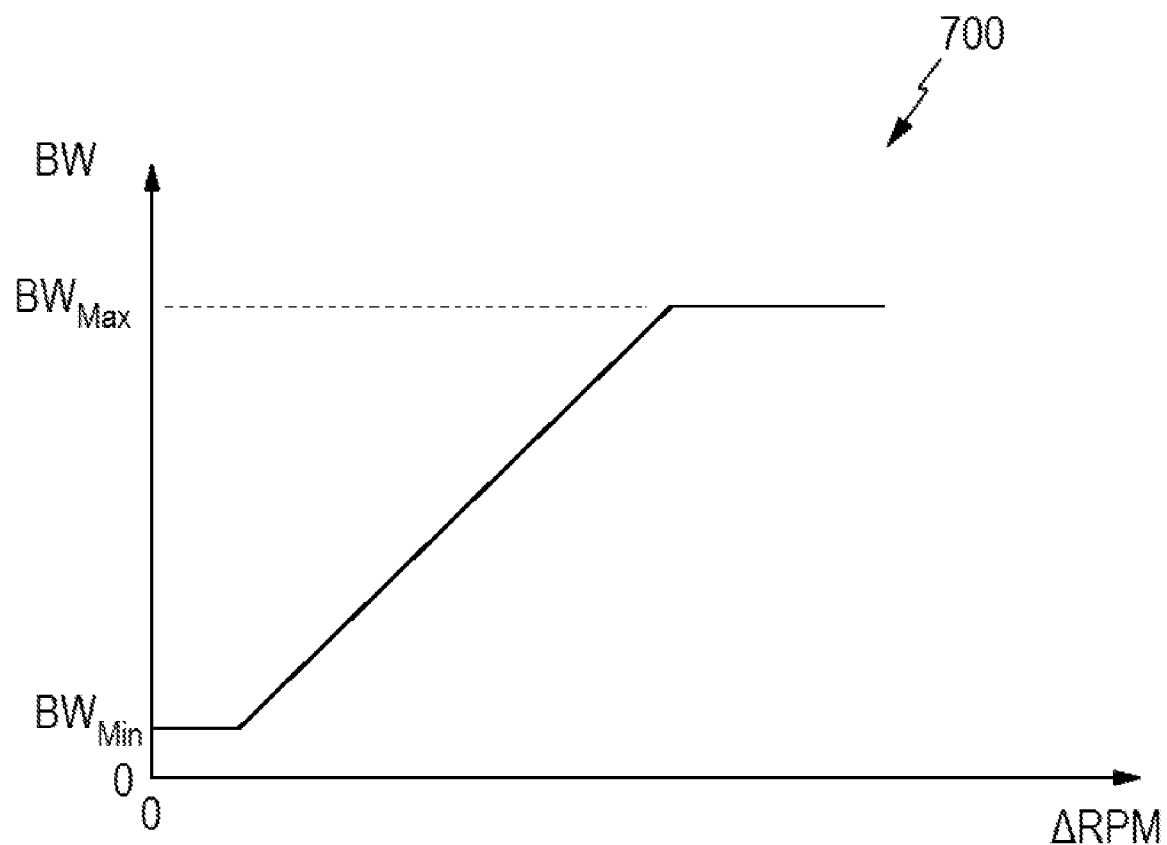
FIG. 7 is a graph of an example relationship between ΔRPM and a notch filter bandwidth.

FIG. 7 illustrates one example of a correlation or mapping 700 of a selected notch bandwidth (y-axis) for a given ΔRPM (x-axis). In this example, a selected notch bandwidth is linearly related to the ΔRPM, but bound between a minimum and a maximum bandwidth. In various examples, ΔRPM may be understood to be a rate of change of RPM, e.g., with respect to time, because while ΔRPM is a difference in RPM at two different times, the time difference ΔT may be held constant in various examples. For instance, in some examples, a value for ΔRPM may be determined every 100 milliseconds as a difference between a current RPM and an RPM value from 100 milliseconds earlier. In other examples, a value for ΔRPM may be determined every 10 milliseconds as a difference between a current RPM and an RPM value from 10 milliseconds earlier. In various examples, a value for ΔRPM may be determined in a range of every 10 to 100 milliseconds.

Some filtering of an RPM signal or a ΔRPM signal may be applied to improve its precision or smoothness. Examples include smoothening (for noise reduction), prediction (to compensate the vehicle's delay in reporting RPM), interpolation (to reduce noise), extrapolation (to add prediction), or any other processing to enhance the accuracy of ΔRPM. In certain cases, ΔRPM can be calculated directly from an analogue signal source such as signals that contain a certain number of pulses per engine rotation.

Rotations per minute (RPM) is a conventional unit of measure of a rotational rate, and in various examples a rotational rate may be measured based upon RPM, or based upon timescales other than a minute, and/or based upon other units. A change in rotational rate may be positive (increasing) or negative (decreasing). In various examples, an absolute value of the change in rotational rate (or rate of change in rotational rate) may be taken as the basis for selecting a notch bandwidth 510.

As described above, and according to various examples, a notch bandwidth 510 for a given filter transfer function 500 may depend upon the harmonic which the notch filter is intended to target. Accordingly, various examples of mapping ΔRPM to a notch bandwidth 510 may vary based upon the harmonic to which it is directed. Additionally, a frequency bandwidth of any given harmonic may depend upon the center frequency of the harmonic, e.g., a 80 Hz $1^{st}$ harmonic may have a different width than a 80 Hz $2^{nd}$ harmonic, and a notch bandwidth 510 may be selected accordingly.

In operation, various examples may filter out numerous notches, such as according to numerous harmonics, by cascading two or more notch filters. Accordingly, in various examples any of the filters 410, 420, 430 may be filters that attenuate or remove multiple notches, e.g., each having its own center frequency and notch bandwidth.

In various examples, notch filter frequencies and notch bandwidths may be more directly controlled by an active sound management system, such as the active sound management system 310. The active sound management system may determine what notches and bandwidths are best suited to reduce interaction of the noise cancellation system with the sounds that the active sound management system is managing. The active sound management system may or may not base these upon a rotational rate.

While the various examples have primarily been described above in relation to a vehicle engine, the noise cancellation systems and methods herein may be applied to any rotating equipment, such as a motor of an electric vehicle, a drivetrain, a transmission, transaxle, wheels, etc.

While the various examples have been described above in relation to a vehicle, the noise cancellation systems and methods disclosed herein may be applied to any environment in which a rotational equipment may generate noise which may be desirable to reduce, such as industrial environments, mass transportation equipment, etc.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of reducing noise in an environment, the method comprising:
   receiving a reference signal representative of a noise to be reduced;
   providing a noise cancellation signal based upon the reference signal;
   receiving a feedback signal representative of a residual noise in the environment; and
   filtering, by a notch filter, at least one of the reference signal, the noise cancellation signal, or the feedback signal, to substantially remove a frequency based upon a rotational rate of a rotating equipment associated with the environment, the notch filter having a bandwidth linearly related to a range of change of the rotational rate.

2. The method of claim 1 further comprising determining a first rotational rate at a first time, determining a second rotational rate at a second time, and determining a difference between the first rotational rate and the second rotational rate as the change of the rotational rate.

3. The method of claim 1 wherein filtering at least one of the reference signal, the noise cancellation signal, or the feedback signal based upon a rotational rate of a rotating equipment includes filtering out a bandwidth of frequencies based upon a rate of change of the rotational rate.

4. The method of claim 1 wherein filtering at least one of the reference signal, the noise cancellation signal, or the feedback signal based upon a rotational rate of a rotating equipment includes filtering out a notch of frequencies centered on a frequency based upon the rotational rate.

5. The method of claim 4 wherein the frequency is a harmonic of the rotational rate.

6. A noise cancellation system comprising:
   a noise sensor configured to provide a reference signal representative of a noise to be reduced in an environment;
   a controller coupled to the noise sensor to receive the reference signal and to provide a noise cancellation signal based upon the reference signal;
   a transducer coupled to the controller to transduce the noise cancellation signal into an acoustic signal in the environment; and
   a notch filter coupled to the controller, the notch filter substantially removing a selected signal based upon a rotational rate of a rotating equipment associated with the environment, the notch filter having a bandwidth linearly related to a range of change of the rotational rate.

7. The noise cancellation system of claim 6 further comprising a feedback sensor to provide a feedback signal representative of a residual noise in the environment and wherein the selected signal is at least one of the reference signal, the noise cancellation signal, and the feedback signal.

8. The noise cancellation system of claim 6 wherein the controller determines a first rotational rate at a first time, determines a second rotational rate at a second time, and determines a difference between the first rotational rate and the second rotational rate as the change of the rotational rate.

9. The noise cancellation system of claim 6 wherein filtering a selected signal based upon a rotational rate of a rotating equipment includes filtering out a bandwidth of frequencies based upon a rate of change of the rotational rate.

10. The noise cancellation system of claim 6 wherein filtering a selected signal based upon a rotational rate of a rotating equipment includes filtering out a notch of frequencies centered on a frequency based upon the rotational rate.

11. A non-transitory computer readable medium having instructions stored thereon that, when executed by a suitable processor, cause the processor to perform a method comprising:
    receiving a reference signal representative of a noise to be reduced in an environment;
    providing a noise cancellation signal based upon the reference signal; and
    filtering, by a notch filter, to substantially remove a selected signal based upon a rotational rate of a rotating equipment associated with the environment, the notch filter having a bandwidth linearly related to a range of change of the rotational rate.

12. The non-transitory computer readable medium of claim 11 further comprising instructions to cause the processor to receive a feedback signal representative of a residual noise in the environment, wherein the selected signal is at least one of the reference signal, the noise cancellation signal, and the feedback signal.

13. The non-transitory computer readable medium of claim 11 further comprising instructions to cause the processor to determine a first rotational rate at a first time, determine a second rotational rate at a second time, and determine a difference between the first rotational rate and the second rotational rate as the change of the rotational rate.

14. The non-transitory computer readable medium of claim 11 wherein filtering a selected signal based upon a rotational rate of a rotating equipment includes filtering out a notch of frequencies centered on a frequency based upon the rotational rate.

* * * * *